United States Patent
Liu et al.

(10) Patent No.: US 10,026,584 B2
(45) Date of Patent: Jul. 17, 2018

(54) METHOD FOR MAKING CARBON NANOTUBE SLURRY

(71) Applicants: Tsinghua University, Beijing (CN); HON HAI PRECISION INDUSTRY CO., LTD., New Taipei (TW)

(72) Inventors: Peng Liu, Beijing (CN); Chun-Hai Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 655 days.

(21) Appl. No.: 14/466,002

(22) Filed: Aug. 22, 2014

(65) Prior Publication Data

US 2014/0361225 A1 Dec. 11, 2014

Related U.S. Application Data

(63) Continuation of application No. 13/606,085, filed on Sep. 7, 2012, now Pat. No. 8,900,485.

(30) Foreign Application Priority Data

Mar. 8, 2012 (CN) .......................... 2012 1 0058512

(51) Int. Cl.
*H01J 29/04* (2006.01)
*H01B 1/04* (2006.01)
(Continued)

(52) U.S. Cl.
CPC ................ *H01J 29/04* (2013.01); *H01B 1/04* (2013.01); *H01B 1/24* (2013.01); *B82Y 40/00* (2013.01);
(Continued)

(58) Field of Classification Search
None
See application file for complete search history.

(56) References Cited

U.S. PATENT DOCUMENTS

| 5,223,176 A * | 6/1993 | Obitsu | A61K 33/24 |
| | | | 106/286.4 |
| 6,630,772 B1 * | 10/2003 | Bower | H01J 1/304 |
| | | | 313/309 |

(Continued)

FOREIGN PATENT DOCUMENTS

| CN | 1700388 | 11/2005 |
| CN | 1912743 | 2/2007 |

(Continued)

OTHER PUBLICATIONS

Product Data Sheet—Silver Powder Type AEP—0505, Released: Dec. 2006, Ames Goldsmith Corp, www.amesgoldsmith.com.*

*Primary Examiner* — Matthew J Daniels
*Assistant Examiner* — Mohammad M Ameen
(74) *Attorney, Agent, or Firm* — ScienBiziP, P.C.

(57) ABSTRACT

A kind of photosensitive carbon nanotube slurry is disclosed. The photosensitive carbon nanotube slurry includes a first mixture and a second mixture. The first mixture includes carbon nanotubes, conducting particles, and a first organic carrier. The second mixture includes a photo polymerization monomer, a photo initiator, and a second organic carrier. The weight percentage of the first mixture and the second mixture ranges from about 50% to about 80% and about 20% to about 50%, respectively. Methods for making the photosensitive carbon nanotube slurry and methods for making cathode emitters using the photosensitive carbon nanotube slurry are also disclosed.

18 Claims, 5 Drawing Sheets

(51) Int. Cl.
  *H01B 1/24*  (2006.01)
  *B82Y 40/00*  (2011.01)
(52) U.S. Cl.
  CPC ........ *Y10S 977/842* (2013.01); *Y10S 977/939* (2013.01)

(56) References Cited

U.S. PATENT DOCUMENTS

| | | | | |
|---|---|---|---|---|
| 2005/0189860 | A1* | 9/2005 | Nam | B82Y 10/00 |
| | | | | 313/311 |
| 2008/0157649 | A1* | 7/2008 | Wei | H01J 9/025 |
| | | | | 313/495 |
| 2008/0174234 | A1* | 7/2008 | Yamamoto | H01J 29/864 |
| | | | | 313/498 |
| 2008/0241695 | A1* | 10/2008 | Song | B82Y 30/00 |
| | | | | 429/231.8 |
| 2008/0278173 | A1 | 11/2008 | Xiao et al. | |
| 2008/0299298 | A1 | 12/2008 | Kim et al. | |
| 2012/0267582 | A1 | 10/2012 | Cai et al. | |

FOREIGN PATENT DOCUMENTS

| | | |
|---|---|---|
| CN | 101303264 | 11/2008 |
| CN | 101321687 | 12/2008 |
| CN | 102184820 | 9/2011 |

\* cited by examiner

METHOD FOR MAKING CARBON NANOTUBE SLURRY

CROSS-REFERENCE TO RELATED APPLICATIONS

This application is a continuation application of U.S. patent application Ser. No. 13/606,085, filed Sep. 7, 2012, entitled, "CARBON NANOTUBE SLURRY, METHOD FOR MAKING THE SAME, AND METHOD FOR MAKING CATHODE EMITTER USING THE SAME", which claims all benefits accruing under 35 U.S.C. § 119 from China Patent Application No. 201210058512.4, filed on Mar. 8, 2012, in the China Intellectual Property Office, the contents of which are hereby incorporated by reference.

FIELD

The present disclosure relates to a carbon nanotube slurry, a method for making the carbon nanotube slurry, and a method for making cathode emitters using the carbon nanotube slurry.

BACKGROUND

Carbon nanotubes (CNT) are tube-shaped structures, and have extremely high electrical conductivity, very small diameters, and a tip-surface area near the theoretical limit. Thus, carbon nanotubes can transmit an extremely high electrical current and can be used to make cathode emitters.

One method for making carbon nanotubes based cathode emitters and assembling the carbon nanotubes in field emission devices is screen-printing. The method includes steps: (a) preparing printable carbon nanotube slurry, which usually includes carbon nanotubes, organic carrier, glass powder and organic solvent; and (b) providing cathode electrodes and forming patterned cathode emitters on surfaces of the cathode electrodes by printing using a screen. The screen-printing process is low in cost and can be easily operated. However, the mesh of the screen can be blocked by particles of the carbon nanotube slurry. Thus, the cathode emitters have trouble in forming a pattern having a size less than 100 microns using the screen-printing method.

What is needed, therefore, is to provide a carbon nanotube slurry and a method for making cathode emitters to overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A photosensitive carbon nanotube slurry of one embodiment includes a first mixture and a second mixture. The first mixture includes carbon nanotubes, conducting particles, and a first organic carrier. The second mixture includes a photo polymerization monomer, a photo initiator, and a second organic carrier. The weight percentage of the first mixture in the photosensitive carbon nanotube slurry can range from about 50% to about 80%. The weight percentage of the second mixture in the photosensitive carbon nanotube slurry can range from about 20% to about 50%. In one embodiment, the first mixture further includes a binder and a stabilizer.

The weight percentage of the carbon nanotubes in the first mixture can range from about 0.1% to about 5%. The weight percentage of the conducting particles in the first mixture can range from about 20% to about 75%. The weight percentage of the binder in the first mixture can range from about 1% to about 25%. The weight percentage of the stabilizer in the first mixture can range from about 0.5% to about 5%. The weight percentage of the first organic carrier in the first mixture can range from about 20% to about 70%.

In one embodiment, the weight percentage of the carbon nanotubes in the first mixture can range from about 0.5% to about 2%. The weight percentage of the conducting particles in the first mixture can range from about 30% to about 70%. The weight percentage of the binder in the first mixture can range from about 5% to about 15%. The weight percentage of the stabilizer in the first mixture can range from about 1% to about 2%. The weight percentage of the first organic carrier in the first mixture can range from about 20% to about 55%.

The carbon nanotubes can be single-walled carbon nanotubes, double-walled carbon nanotubes, multi-walled carbon nanotubes, and combinations thereof. The diameter of each single-walled carbon nanotube can range from about 0.5 nanometers to about 50 nanometers. The diameter of each double-walled carbon nanotube can range from about 1 nanometer to about 50 nanometers. The diameter of each multi-walled carbon nanotube can range from about 1.5 nanometers to about 50 nanometers. The length of the carbon nanotubes can be in a range from about 1 micron to about 15 microns. The carbon nanotubes can be prepared by chemical vapor deposition method, arc discharge method, laser ablation method or any other methods.

The conducting particles can be metal particles, indium tin oxide particles or combinations thereof. The metal particles can be gold particles, silver particles, aluminum particles, and copper particles. The metal particles in the first mixture have high chemical stability. Therefore, the metal particles cannot be easily oxidized during a heat-treatment process and can retain a good electrical conductivity. The particle size of the conducting particles can be less than or equal to 1 micron. The specific surface area of the conducting particles can be in a range from about 1 $m^2/g$ to about 3 $m^2/g$.

The binder is inorganic binder in one embodiment. The binder can be glass powder, silicon oxide powder, silicone resin powder or combinations thereof. The binder of one embodiment is a low melting point glass powder with a melting point in a range from about 350° C. to about 600° C. The effective diameter of the binder can be less than or equal to 1 micron.

The stabilizer is citric acid in one embodiment. The function of the stabilizer is to complex the ionic conducting particles and let the conducting particles evenly distribute in the first organic carrier.

The first organic carrier is a volatilizable organic material and can be removed by heating. The first organic carrier includes ethyl cellulose, terpineol, and ethanol. The weight percentage of the ethyl cellulose in the first organic carrier can range from about 10% to about 40%. The weight percentage of the terpineol in the first organic carrier can range from about 30% to about 50%. The weight percentage of the ethanol in the first organic carrier can range from about 30% to about 50%. The ethyl cellulose has strong polarity and can form a network structure or chain structure to enhance the viscosity and plasticity of the photosensitive carbon nanotube slurry. The terpineol acts as a diluent to dissolve the ethyl cellulose and allows the photosensitive carbon nanotube slurry to have liquidity. The ethanol acts as solvent to dissolve the carbon nanotubes, conducting particles, and binder.

The weight percentage of the photo polymerization monomer in the second mixture can range from about 20% to about 60%. The weight percentage of the photo initiator in the second mixture can range from about 10% to about 40%. The weight percentage of the second organic carrier in the second mixture can range from about 30% to about 40%.

In one embodiment, the weight percentage of the photo polymerization monomer in the second mixture can range from about 30% to about 50%. The weight percentage of the photo initiator in the second mixture can range from about 15% to about 35%. The weight percentage of the second organic carrier in the second mixture can range from about 30% to about 35%.

The photo polymerization monomer can be methyl acrylate, ethyl acrylate, N-butyl acrylate, methyl methacrylate, ethyl methacrylate, N-butyl methacrylate, and combinations thereof. The function of the photo polymerization monomer is to crosslink and cure under the condition of certain illumination and photo initiator.

The photo initiator can be free radical photo initiator or cationic photo initiator. The function of the photo initiator is to initiate the photo polymerization monomer to crosslink and cure under certain illumination condition.

The second organic carrier can be terpineol or ethanol.

In one embodiment, the weight percentage of the first mixture in the photosensitive carbon nanotube slurry is 70% and the weight percentage of the second mixture in the photosensitive carbon nanotube slurry is 30%. The carbon nanotubes are multi-walled carbon nanotubes with a diameter from about 10 nanometers to about 30 nanometers and a length in a range from about 2 microns to about 5 microns. The conducting particles are silver particles with a particle size from about 0.5 microns to about 1 micron. The binder is glass powder with an effective diameter from about 0.5 microns to about 1 micron. The stabilizer is citric acid. The first organic carrier consists of ethyl cellulose, terpineol, and ethanol. The weight ratio of the ethyl cellulose, terpineol and ethanol is 1:2:2. The weight percentage of the carbon nanotubes in the first mixture is 0.5%. The weight percentage of the silver particles in the first mixture is 70%. The weight percentage of the glass powder in the first mixture is 8.5%. The weight percentage of the citric acid in the first mixture is 1%. The weight percentage of the first organic carrier in the first mixture is 20%. The photo polymerization monomer is methyl methacrylate. The photo initiator is TPO. The second organic carrier is terpineol. The weight percentage of the methyl methacrylate in the second mixture is 50%. The weight percentage of the TPO in the second mixture is 15%. The weight percentage of the terpineol in the second mixture is 35%.

In another embodiment, the weight percentage of the first mixture in the photosensitive carbon nanotube slurry is 80% and the weight percentage of the second mixture in the photosensitive carbon nanotube slurry is 20%. The carbon nanotubes are multi-walled carbon nanotubes with a diameter from about 30 nanometers to about 50 nanometers and a length in a range from about 5 microns to about 10 microns. The conducting particles are silver particles with a particle size from about 0.1 microns to about 0.5 micron. The binder is glass powder with an effective diameter from about 0.1 microns to about 0.5 micron. The stabilizer is citric acid. The first organic carrier consists of ethyl cellulose, terpineol and ethanol and the weight ratio of the ethyl cellulose, terpineol and ethanol is 1:4:5. The weight percentage of the carbon nanotubes in the first mixture is 2%. The weight percentage of the silver particles in the first mixture is 65%. The weight percentage of the glass powder in the first mixture is 10%. The weight percentage of the citric acid in the first mixture is 2%. The weight percentage of the first organic carrier in the first mixture is 21%. The photo polymerization monomer is methyl methacrylate. The photo initiator is TPO. The second organic carrier is terpineol. The weight percentage of the methyl methacrylate in the second mixture is 30%. The weight percentage of the TPO in the second mixture is 35%. The weight percentage of the terpineol in the second mixture is 35%.

A method for making a photosensitive carbon nanotube slurry includes the following steps of:

(S1) providing carbon nanotubes, conducting particles, a binder and a stabilizer;

(S2) dissolving the carbon nanotubes, conducting particles, binder and stabilizer into a first organic carrier to obtain a first mixture;

(S3) providing a photo polymerization monomer and a photo initiator;

(S4) dissolving the photo polymerization monomer and photo initiator into a second organic carrier to obtain a second mixture; and (S5) mixing the first mixture and the second mixture to obtain a photosensitive carbon nanotube slurry.

In step (S2), the carbon nanotubes, conducting particles and binder are firstly dissolved into the first organic carrier. The stabilizer is finally dissolved into the first organic carrier.

In step (S4), the photo polymerization monomer is firstly dissolved into the second organic carrier. The photo initiator is secondly dissolved into the second organic carrier.

In step (S2), (S4) and (S5), mechanical agitation or ultrasonic agitation can be performed during the dissolving or mixing process.

In one embodiment, an optional step (S6) of mechanical extruding and shearing the photosensitive carbon nanotube slurry can be performed after step (S5).

The step (S6) can further facilitate particles in the photosensitive carbon nanotube slurry be evenly distributed. In one embodiment, repeated mechanical extruding and shearing of the photosensitive carbon nanotube slurry is performed. The step (S6) can be performed by rolling machine, colloid mill, emulsifying machine or kneader. In one embodiment, a 3-roller rolling machine is applied to treat the photosensitive carbon nanotube slurry.

A method for making cathode emitters using the photosensitive carbon nanotube slurry includes the following steps of:

(a) coating the photosensitive carbon nanotube slurry onto a glass substrate;

(b) drying the photosensitive carbon nanotube slurry;

(c) exposing the photosensitive carbon nanotube slurry with a mask;

(d) developing the photosensitive carbon nanotube slurry; and (e) heating the photosensitive carbon nanotube slurry in a vacuum or in a protection gas.

In step (a), the photosensitive carbon nanotube slurry can be coated onto the glass substrate by spinning, spraying, dipping, rolling, brushing or screen printing. The photosensitive carbon nanotube slurry includes carbon nanotubes, conducting particles, first organic carrier, photo polymerization monomer, photo initiator, and second organic carrier.

In step (b), the drying temperature can range from about 50° C. to about 100° C. The drying time can range from about 5 minutes to about 30 minutes.

In step (c), halogen lamps, high-pressure lamps, laser or metal halide lamps can be used as exposure light source. In one embodiment, a contact exposure process is performed, so the contact of the mask and the photosensitive carbon nanotube slurry will not destroy the structures of the photosensitive carbon nanotube slurry and the cathode emitters formed later. In another embodiment, a non-contact exposure process is performed. The exposure energy can range from about 300 mJ/cm$^2$ to about 500 mJ/cm$^2$.

In step (d), the developing process can be performed by spraying a developer onto the glass substrate or by immersing the glass substrate into the developer. The developer used in one embodiment is sodium carbonate solution with a weight percentage ranges from about 0.5% to about 1.5%.

In step (e), the function of the heating process is to melt the binder to fix the photosensitive carbon nanotube slurry onto the glass substrate to form cathode emitters. The heating temperature can range from about 350° C. to about 650° C. The heating time can range from about 15 minutes to about 45 minutes. The protection gas can be selected from nitrogen, argon, and helium.

In one embodiment, an optional step (f) of surface treating the cathode emitters can be performed after step (e).

The method of surface treating can be surface polishing, plasma etching, laser etching, or adhesive tape peeling. In one embodiment, the surface of the cathode emitters is treated by adhesive tape to peel part of the carbon nanotubes that is not firmly attached on the glass substrate. The remaining carbon nanotubes are firmly attached on the glass substrate, substantially vertical and dispersed uniformly. Therefore, interference from the electric fields between the carbon nanotubes is reduced and the field emission performances of the cathode emitters are enhanced.

Figure 1:
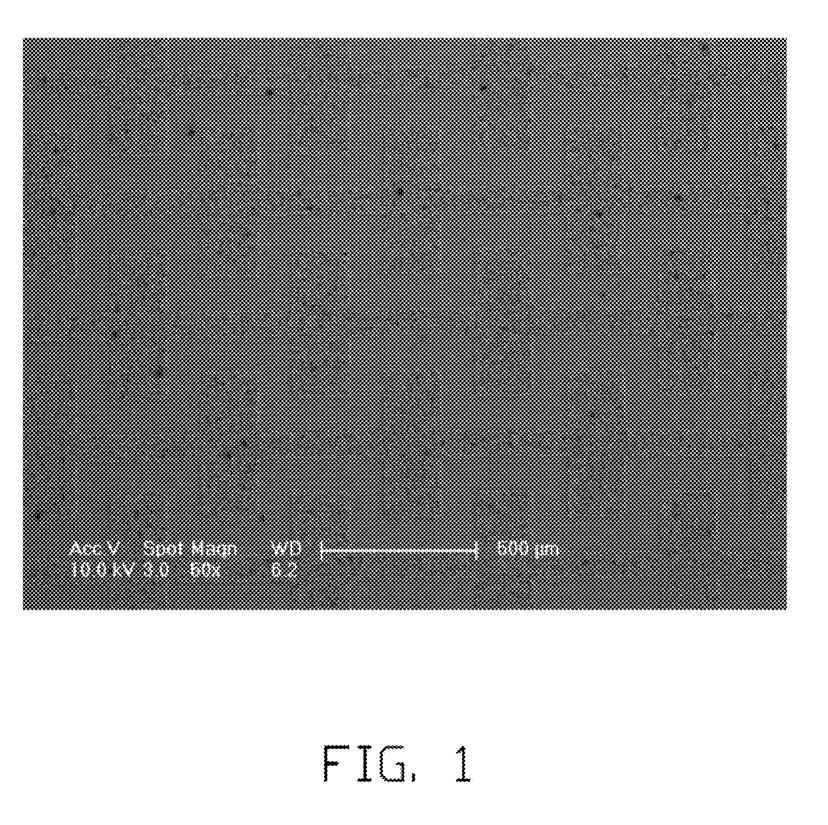
FIG. 1 is a scanning electron microscope (SEM) image of patterned cathode emitters based on carbon nanotubes of one embodiment.
Figure 2:
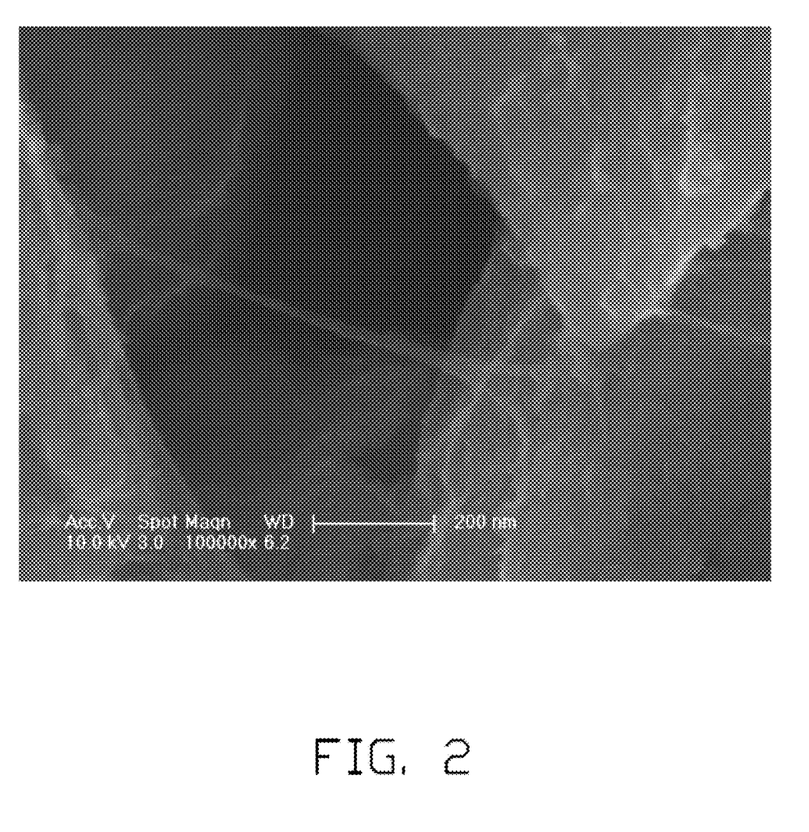
FIG. 2 is a SEM image of carbon nanotubes in cathode emitters of one embodiment.

FIG. 1 shows patterned cathode emitters based on the photosensitive carbon nanotube slurry made by one embodiment of the above method. FIG. 2 shows structures of the carbon nanotubes in the patterned cathode emitters of FIG. 1. It can be seen that the size of the patterned cathode emitters is smaller than 100 microns in some position. The stability and regularity of the patterned cathode emitters are both relatively high.

Figure 3:
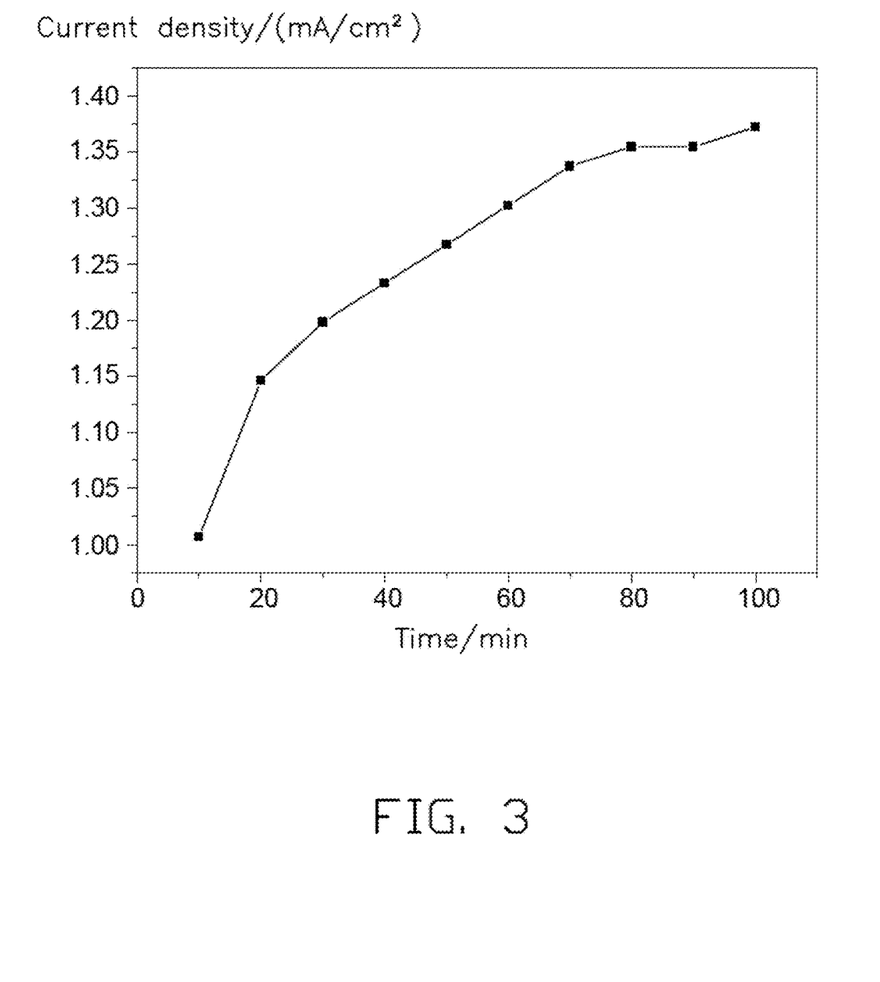
FIG. 3 shows a current density vs. time curve of cathode emitters of one embodiment.
Figure 4:
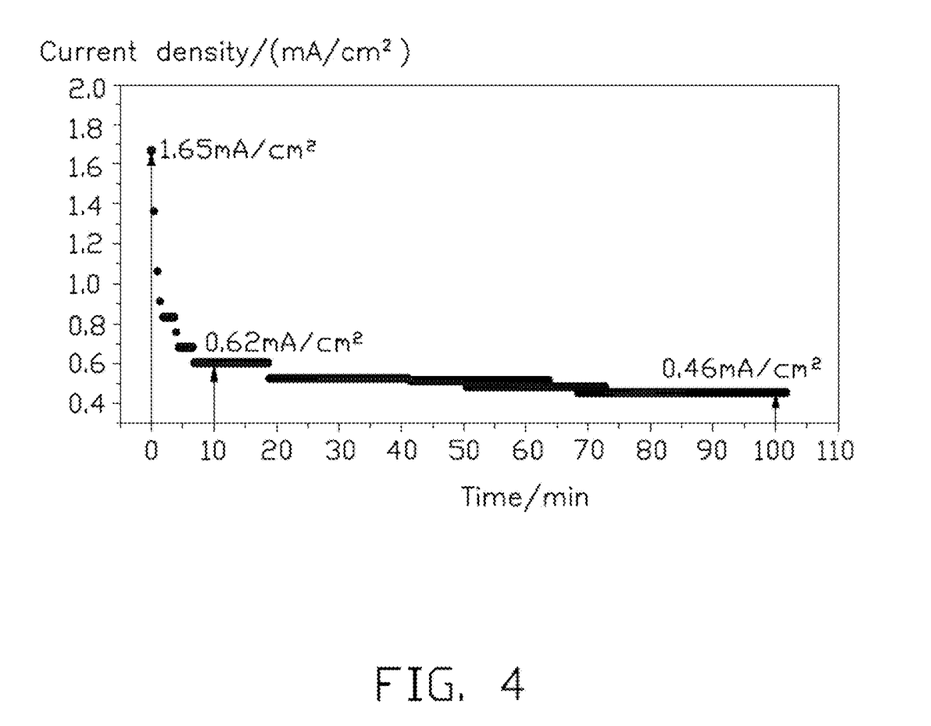
FIG. 4 shows a current density vs. time curve of cathode emitters of related art.

FIG. 3 shows a field emission performances curve of the patterned cathode emitters. The emission current density of the patterned cathode emitters continuously increases, which is significantly different from the trend of the cathode emitters in a related art shown in FIG. 4. Furthermore, the stable emission current density of the patterned cathode emitters (about 1.38 mA/cm$^2$) is much higher than the stable emission current density of the cathode emitters of the related art (about 0.46 mA/cm$^2$) after 100 minutes.

Figure 5:
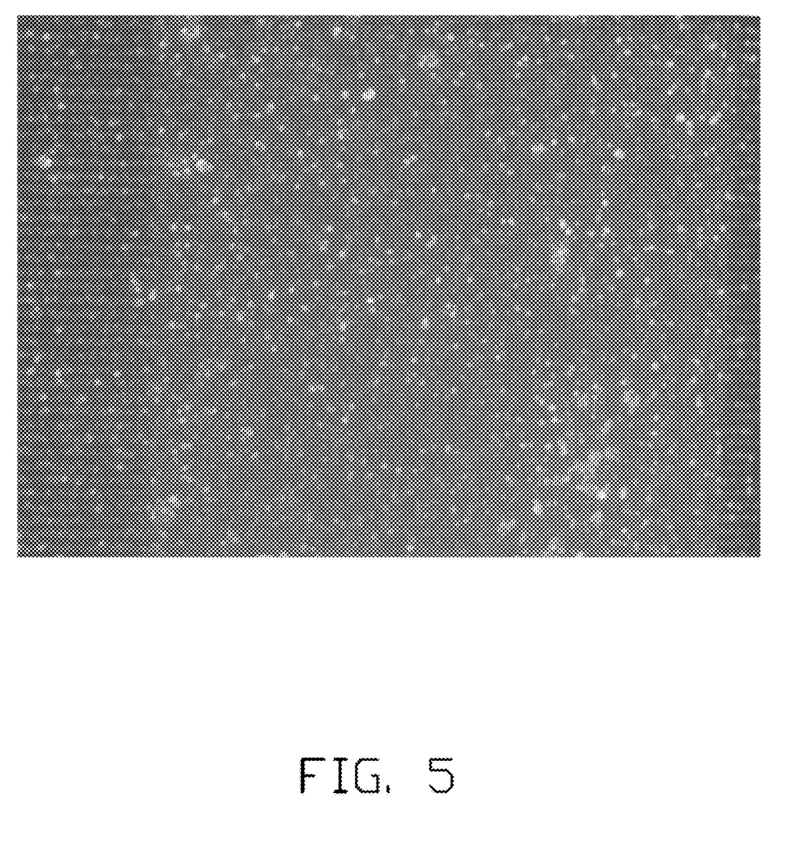
FIG. 5 is a field emission image of cathode emitters of one embodiment.

FIG. 5 shows a field emission image of the patterned cathode emitters. It can be seen that the field emission spots in the image are evenly distributed. When the patterned cathode emitters are applied to a display device, the display device will have a uniform brightness.

The photosensitive carbon nanotube slurry and cathode emitters made using the same have the following advantages. Firstly, the photosensitive carbon nanotube slurry can form small-sized patterned cathode emitters (smaller than 100 microns) by the combination of printing and lithography, due to the existence of the photo polymerization monomer in the slurry. Secondly, the degradation of the field emission performances of the cathode emitters can be effectively impeded, due to the high electrical and thermal conductivity of the carbon nanotubes.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a photosensitive carbon nanotube slurry comprising:

providing carbon nanotubes, conducting particles, a binder, a stabilizer, a first organic carrier, a photo polymerization monomer, a photo initiator and a second organic carrier; wherein the first organic carrier comprises ethyl cellulose, terpineol, and ethanol, a weight percentage of the ethyl cellulose in the first organic carrier ranges from about 10% to about 40%, a weight percentage of the terpineol in the first organic carrier ranges from about 30% to about 50%, and a weight percentage of the ethanol in the first organic carrier ranges from about 30% to about 50%;

dissolving the carbon nanotubes, the conducting particles, the binder, and the stabilizer into the first organic carrier to obtain a first mixture; wherein a weight percentage of the carbon nanotubes in the first mixture ranges from about 0.1% to about 5%, a weight percentage of the conducting particles in the first mixture ranges from about 20% to about 75%, a weight percentage of the binder in the first mixture ranges from about 1% to about 25%, a weight percentage of the stabilizer in the first mixture ranges from about 0.5% to about 5%, and a weight percentage of the first organic carrier in the first mixture ranges from about 20% to about 70%;

dissolving the photo polymerization monomer and the photo initiator into the second organic carrier to obtain a second mixture; wherein a weight percentage of the photo polymerization monomer in the second mixture ranges from about 30% to about 50%, a weight percentage of the photo initiator in the second mixture ranges from about 15% to about 35%, and a weight percentage of the second organic carrier in the second mixture ranges from about 30% to about 35%; and mixing the first mixture and the second mixture to form the photosensitive carbon nanotube slurry, wherein a weight percentage of the first mixture in the photosensitive carbon nanotube slurry ranges from about 50% to about 80%, and a weight percentage of the second mixture in the photosensitive carbon nanotube slurry ranges from about 20% to about 50%.

2. The method as claimed in claim 1, wherein a weight percentage of the carbon nanotubes in the first mixture ranges from about 0.5% to about 2%, a weight percentage of the conducting particles in the first mixture ranges from about 30% to about 70%, a weight percentage of the binder in the first mixture ranges from about 5% to about 15%, a weight percentage of the stabilizer in the first mixture ranges from about 1% to about 2%, and a weight percentage of the first organic carrier in the first mixture ranges from about 20% to about 55%.

3. The method as claimed in claim 1, wherein the binder is selected from the group consisting of glass powder, silicon oxide powder and silicone resin powder, and a melting point of the binder is in a range from about 350° C. to about 600° C.

4. The method as claimed in claim 1, wherein a length of the carbon nanotubes is in a range from about 1 micron to about 15 microns.

5. The method as claimed in claim 1, wherein the conducting particles are selected from the group consisting of silver particles, copper particles, gold particles, aluminum particles and indium tin oxide particles.

6. The method as claimed in claim 1, wherein the photo polymerization monomer is selected from the group consisting of methyl acrylate, ethyl acrylate, N-butyl acrylate, methyl methacrylate, ethyl methacrylate and N-butyl methacrylate.

7. The method as claimed in claim 1, wherein the second organic carrier is terpineol or ethanol.

8. The method as claimed in claim 1, wherein a particle size of the conducting particles is less than or equal to 1 micron.

9. The method as claimed in claim 1, wherein a specific surface area of the conducting particles is in a range from about 1 m$^2$/g to about 3 m$^2$/g.

10. The method as claimed in claim 1, further comprising mechanical extruding and shearing the photosensitive carbon nanotube slurry after mixing the first mixture and the second mixture.

11. The method as claimed in claim 10, wherein the mechanical extruding and shearing is performed by a rolling machine, a colloid mill, an emulsifying machine or a kneader.

12. The method as claimed in claim 1, further comprising dissolving a citric acid into the first organic carrier.

13. The method as claimed in claim 1, wherein the weight percentage of the first mixture in the photosensitive carbon nanotube slurry is 70%, and the weight percentage of the second mixture in the photosensitive carbon nanotube slurry is 30%; the carbon nanotubes are multi-walled carbon nanotubes with a diameter from about 10 nanometers to about 30 nanometers and a length in a range from about 2 microns to about 5 microns, and the weight percentage of the carbon nanotubes in the first mixture is 0.5%; the conducting particles are silver particles with a particle size from about 0.5 microns to about 1 micron, and the weight percentage of the silver particles in the first mixture is 70%; the binder is glass powder with an effective diameter from about 0.5 microns to about 1 micron, and the weight percentage of the glass powder in the first mixture is 8.5%; the stabilizer is citric acid, and the weight percentage of the citric acid in the first mixture is 1%; the first organic carrier consists of ethyl cellulose, terpineol, and ethanol, the weight ratio of the ethyl cellulose, terpineol and ethanol is 1:2:2, and the weight percentage of the first organic carrier in the first mixture is 20%; the photo polymerization monomer is methyl methacrylate, and the weight percentage of the methyl methacrylate in the second mixture is 50%; the photo initiator is TPO, and the weight percentage of the TPO in the second mixture is 15%; and the second organic carrier is terpineol, and the weight percentage of the terpineol in the second mixture is 35%.

14. A method for making a photosensitive carbon nanotube slurry comprising:

providing carbon nanotubes, conducting particles, a first organic carrier, a photo polymerization monomer, a photo initiator and a second organic carrier; wherein the first organic carrier comprises ethyl cellulose, terpineol, and ethanol; a weight percentage of the ethyl cellulose in the first organic carrier ranges from about 10% to about 40%, a weight percentage of the terpineol in the first organic carrier ranges from about 30% to about 50%, and a weight percentage of the ethanol in the first organic carrier ranges from about 30% to about 50%;

dissolving the carbon nanotubes and the conducting particles into the first organic carrier to obtain a first mixture;

dissolving the photo polymerization monomer and the photo initiator into the second organic carrier to obtain a second mixture; and mixing the first mixture and the second mixture to form the photosensitive carbon nanotube slurry, wherein a weight percentage of the first mixture in the photosensitive carbon nanotube slurry ranges from about 50% to about 80%, and a weight percentage of the second mixture in the photosensitive carbon nanotube slurry ranges from about 20% to about 50%.

15. The method as claimed in claim 14, wherein the first organic carrier consists of ethyl cellulose, terpineol, and ethanol, the weight ratio of the ethyl cellulose, terpineol and ethanol is 1:2:2.

16. The method as claimed in claim 14, further comprising dissolving a binder and a stabilizer into the first organic carrier.

17. The method as claimed in claim 16, wherein a weight percentage of the carbon nanotubes in the first mixture ranges from about 0.1% to about 5%, a weight percentage of the conducting particles in the first mixture ranges from about 20% to about 75%, a weight percentage of the binder in the first mixture ranges from about 1% to about 25%, a weight percentage of the stabilizer in the first mixture ranges from about 0.5% to about 5%, and a weight percentage of the first organic carrier in the first mixture ranges from about 20% to about 70%.

18. The method as claimed in claim 16, wherein the weight percentage of the first mixture in the photosensitive carbon nanotube slurry is 70%, and the weight percentage of the second mixture in the photosensitive carbon nanotube slurry is 30%;

wherein the carbon nanotubes are multi-walled carbon nanotubes with a diameter from about 10 nanometers to about 30 nanometers and a length in a range from about 2 microns to about 5 microns, and the weight percentage of the carbon nanotubes in the first mixture is 0.5%;

the conducting particles are silver particles with a particle size from about 0.5 microns to about 1 micron, and the weight percentage of the silver particles in the first mixture is 70%;

the binder is glass powder with an effective diameter from about 0.5 microns to about 1 micron, and the weight percentage of the glass powder in the first mixture is 8.5%;

the stabilizer is citric acid, and the weight percentage of the citric acid in the first mixture is 1%;

the first organic carrier consists of ethyl cellulose, terpineol, and ethanol, the weight ratio of the ethyl cellulose, terpineol and ethanol is 1:2:2, and the weight percentage of the first organic carrier in the first mixture is 20%;

the photo polymerization monomer is methyl methacrylate, and the weight percentage of the methyl methacrylate in the second mixture is 50%;

the photo initiator is TPO, and the weight percentage of the TPO in the second mixture is 15%; and  the second organic carrier is terpineol, and the weight percentage of the terpineol in the second mixture is 35%.

\* \* \* \* \*